United States Patent [19]

Drehman

[11] 3,978,820

[45] Sept. 7, 1976

[54] PROTECTIVE PET COLLAR

[76] Inventor: Vera L. Drehman, 17710 SW. 109 Place, Perrine, Fla. 33157

[22] Filed: July 19, 1974

[21] Appl. No.: 489,917

Related U.S. Application Data

[63] Continuation of Ser. No. 351,801, May 29, 1973.

[52] U.S. Cl. ............................................. 119/106
[51] Int. Cl.² .................................... A01K 27/00
[58] Field of Search ......... 119/106, 109, 156, 157, 119/160; 2/311, 321; 150/52 M; 74/558

[56] References Cited
UNITED STATES PATENTS

| 293,700 | 2/1884 | Babcock | 119/109 |
| 2,058,740 | 10/1936 | Summers | 150/52 M |
| 2,401,253 | 5/1946 | Lamb, Jr. | 119/106 |
| 3,814,061 | 6/1974 | Aries et al. | 119/106 |

Primary Examiner—Russell R. Kinsey
Assistant Examiner—J. N. Eskovitz
Attorney, Agent, or Firm—Watson, Cole, Grindle & Watson

[57] ABSTRACT

A pet collar for holding a strip of insecticide impregnated material around the neck of an animal. A strip of flexible material is provided with its longitudinal edges folded over towards its center so as to form a longitudinal holder. This longitudinal holder is capable of holding a strip of insecticide impregnated material. A plurality of openings are provided in each end of the holder and a lace is provided which is capable of passing through these openings for tying the ends of the holder together so as to secure the holder around the neck of the animal.

3 Claims, 4 Drawing Figures

PROTECTIVE PET COLLAR

RELATED APPLICATION

The present application is a continuation of application Ser. No. 351,801, filed May 29, 1973.

BACKGROUND OF THE INVENTION

The present invention relates to the provision of an arrangement for securing a strip of insecticide impregnated material around the neck of an animal.

During recent years, various strips of insecticide impregnated materials have become commercially available for utilization by people for their pets. These insecticide strips are generally placed around the neck of an animal in direct skin contact with the animal. While it is desirable to have the quantity of insecticide within the strip of a sufficient strength to protect the animal against fleas, it is possible for this insecticide to cause a skin irritation. Consequently, many animals are unable to wear such an insecticide impregnated collar thereby depriving them of the benefits of insecticidal control of various vermins.

The problem which occurs with the animal due to the insecticide is generally a result of either allergenic or toxic reaction within the hair or on the skin of the animal. This can result in side effects ranging from a mild irritation to severe outbreak of sores. Furthermore, when the insecticide enters the animal's system through these skin lesions, toxic effects range from illness to a critical worsening of the sores which can lead to death. Especially once the skin of the animal has become sensitive to the insecticide, the animal will react to even the slightest contact with the insecticide strip.

SUMMARY OF THE INVENTION

An object of the present invention is to provide a health protector pet collar which eliminates those drawbacks discussed above.

A further object of the present invention is to provide a pet collar which is capable of holding an insecticide impregnated strip while providing a physical barrier between the strip and the hair and skin of an animal.

A further object of the present invention is to provide a protective collar which does not interfere with the activities of the animal.

A still further object of the present invention is to provide a protective collar which is both sanitary, inasmuch as it is totally washable, and additionally is durable and economical.

Still another object of the present invention is to provide a protective pet collar which can be easily and readily attached to the neck of the animal.

In order to accomplish these objectives, a strip of flexible material is provided with its longitudinal edges being folded over towards its center so as to form a longitudinal holder. This longitudinal holder is capable of receiving a strip of insecticide impregnated material which extends longitudinally within the holder. A plurality of openings are provided in each end of the holder and a lace is provided which is capable of passing through these openings for tying the ends of the holder together so as to secure the holder around the neck of an animal.

DESCRIPTION OF THE PREFERRED EMBODIMENT

Figure 1:
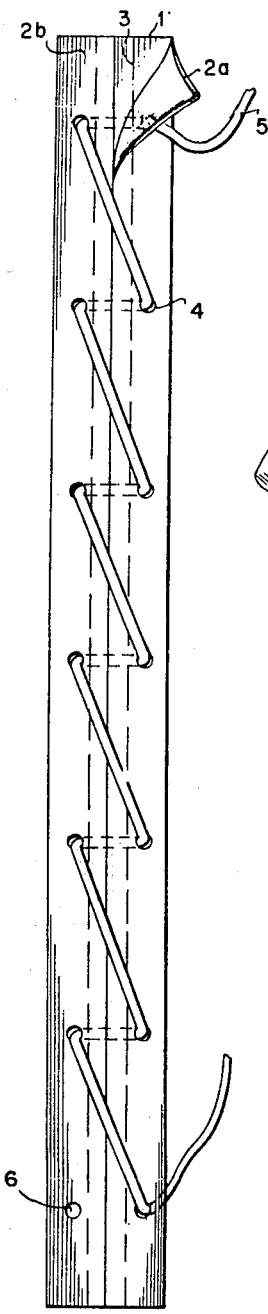
FIG. 1 is a front view of the pet collar in accordance with the present invention with the strip of insecticide material inserted.

A strip of flexible material 1 has its longitudinal edges 2a and 2b folded over towards its center so as to effectively constitute a holder, as illustrated in FIG. 1. A strip of insecticide impregnated material is inserted within this holder and extends along the longitudinal axis of the holder. A plurality of openings 4 are provided along each longitudinal edge of the flexible strip 1. A lace 5 is then threaded through these openings so as to secure the two longitudinal edges together and so as to hold the strip of insecticide material within the holder. In this manner, the strip of insecticide material 3 is secured within the holder with the holder providing an effective barrier to prevent the strip from coming into actual contact with either the hair or the skin of the animal on which the collar is worn. The vapors of the insecticide however, are allowed to safely and effectively escape the collar and to protect the animal against various vermins.

Figure 2:
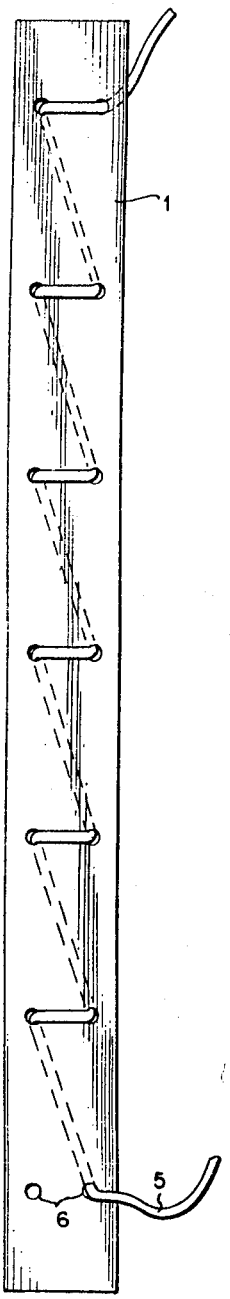
FIG. 2 is a rear view of the pet collar illustrated in FIG. 1.
Figure 3:
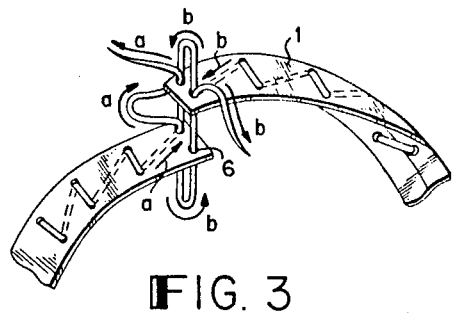
FIG. 3 is a prospective view of the end sections of the holder illustrated in FIG. 1 with an illustration of the manner of tying the ends together by utilization of the lace.
Figure 4:
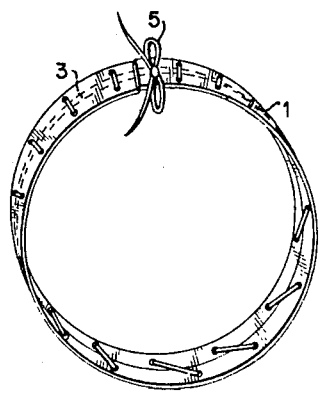
FIG. 4 is a prospective view of the entire pet collar in accordance with the present invention.

The lacing pattern for lacing the longitudinal edges of the flexible strip 1 together can be seen from the front view illustrated in FIG. 1 of the holder and the rear view illustrated in FIG. 2. A plurality of openings 6 are also provided in the ends of the holder. The lace can be utilized for passing through the openings in these ends and tying the two ends together as illustrated in FIGS. 3 and 4. In this manner, the pet collar can be secured around the neck of the animal.

It is furthermore possible for this pet collar to act as a decorative collar and additionally to be utilized for carrying the various tags worn by the animal.

It is noted that the above description and the accompanying drawings are provided merely to present an exemplary embodiment of the present invention and that additional modifications of this embodiment are possible within the scope of this invention without deviating from the spirit thereof.

I claim:
1. A pet collar comprising:
   a strip of flexible material having its longitudinal edges folded over towards a central axis of said strip of flexible material so as to form a longitudinally extending holder having inner surfaces forming an internal passage and outer surfaces, said holder being capable of receiving a strip of insecticide impregnated material;
   a first plurality of openings provided in each end of said holder;
   a lace passing through said openings within said holder for tying said ends of said holder together;
   a second plurality of openings provided along each longitudinal edge of said flexible strip and said lace being threaded through said second openings so as to join the longitudinal edges of said flexible strip together; and a strip of insecticide impregnated material positioned longitudinally within said passage.

2. A pet collar as defined in claim 1 wherein said impregnated material contains an insecticide capable of preventing fleas from attacking the skin of a pet and said holder serves to protect the skin of such a pet from direct contact with the insecticide material.

3. A pet collar as defined in claim 2 wherein said flexible material is a vinyl, cotton, synthetic fiber, or other suitable material.

* * * * *